G. W. EICHHOLTZ.
Fly-Traps.

No. 145,791.                                Patented Dec. 23, 1873.

Witnesses:

Inventor:
G. W. Eichholtz
Per
Attorneys.

UNITED STATES PATENT OFFICE.

GEORGE W. EICHHOLTZ, OF NEW BERLIN, ILLINOIS.

IMPROVEMENT IN FLY-TRAPS.

Specification forming part of Letters Patent No. 145,791, dated December 23, 1873; application filed August 4, 1873.

*To all whom it may concern:*

Figure 1:
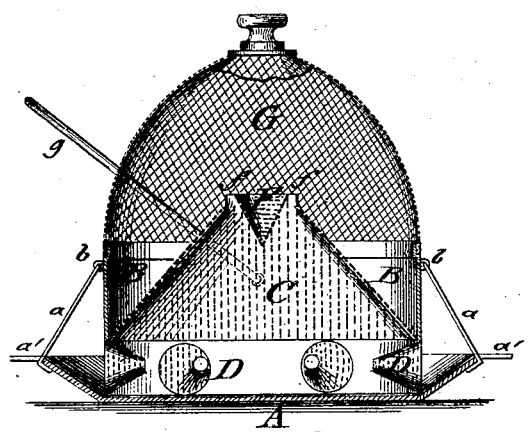
Figure 2:
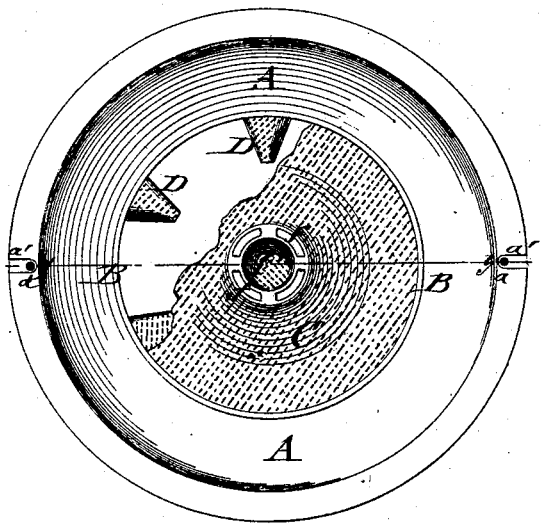

Be it known that I, GEORGE W. EICHHOLTZ, of New Berlin, in the county of Sangamon and State of Illinois, have invented a new and Improved Fly-Trap, of which the following is a specification:

In the accompanying drawing, Figure 1 represents a vertical central section of my improved fly-trap, and Fig. 2 a top view of the same with covers detached and parts cut away.

My invention consists in a certain construction and mode of connection of a base-plate, sheet-metal cylinder, and inner and outer wire-gauze cones, as hereinafter described.

In the drawing, A represents the bottom or base plate, made of tin or other sheet metal, to which is attached the cylindrical body B, of like material. Within the latter a wire-gauze cone, C, is arranged at suitable height above plate A. Hooks a, which are applied by staples b to part B, lock into short radial slots a' of plate A, forming thereby a very simple and reliable connection of these parts, and allowing the easy and convenient cleaning of plate and cone, and the ready insertion of the bait. At the lower edge of body B, below main cone C, are arranged small wire-gauze cones D, through which the flies enter, in search of the bait. The main cone C is truncated, and provided with a small inverted cone, F, forming circular slots f with it, through which the flies pass up into the upper part of the trap above cone C. This upper chamber consists merely of a common wire-cloth dish-cover, G, which fits tightly on the upper edge of body B, but is removable therefrom. A pivoted bail or handle, g, of strong wire, which is attached sidewise to body B, completes the trap, and permits its ready removal to any desired place.

What I claim is—

The vertical sheet-metal body B, removably connected with the slotted base plate A by pivoted hooks a, and having the wire-gauze entrance-cones D, inner wire-gauze cone C F, and removable wire-gauze cover G connected therewith, all combined as shown and described, for the purpose specified.

GEORGE W. EICHHOLTZ.

Witnesses:
R. D. SMITH,
I. R. GREGORY.